3,236,793
BIS(TRIBUTYLTIN)ADIPATE AND ANTIFOULING COMPOSITIONS COMPRISING SAME

Janis Robins, St. Paul, and David M. Updegraff, North Oaks, Minn., assignors to Minnesota Mining & Manufacturing Company, St. Paul, Minn., a corporation of Delaware
No Drawing. Filed Oct. 2, 1961, Ser. No. 141,979
3 Claims. (Cl. 260—19)

This invention relates to compositions adapted to the prevention of marine fouling, and particularly to paints for structures immersed in sea water.

The problem of the fouling of marine structures has been recognized for many years (cf. Protective and Decorative Coatings, J. J. Mattiello, vol. III, chapter 12B, John Wiley and Sons, Inc., New York, 1943). Stationary structures such as piers, wharves and the like become encrusted with organisms below the water lines and are unsightly. The problem with moving structures such as boats and barges of all types is more serious since not only are they made unsightly by the algal growth which occurs near the water line, but, of even greater significance, the extensive growth on the submerged part of the hull results in increased resistance to movement through the water and a consequent waste of power. Furthermore, the calcareous shells of the barnacles may cause breakage of the protective paint film and open the way for corrosion of metal hulls or invasion of wooden hulls by one or more of the numerous marine borers which abound in some waters and weaken wooden structures. This latter problem furthermore extends to stationary structures and is exacerbated by the difficulty of cleaning such structures at regular intervals; which can be done for vessels by drydocking, scraping and repainting. It is well recognized that fouling in its broad sense is a serious problem which leads to economic loss throughout the world.

Prior art compositions have suffered from the fact that most such compositions, while they are eventually toxic to the fouling organisms, do not wholly prevent the attachment of the "cypris" larvae. This is the stage in the development of the larva of the barnacle at which it is capable of attachment. As a result, the barnacle grows for a greater or lesser time and then dies, leaving a calcareous plate attached to the submerged structure. This provides a roughened surface which increases friction in the water and serves as a secondary base for further attachment of organisms, which are at least to some extent protected from the anti-fouling paint thereby. Thus, although many prior art compositions have shown useful inhibition of fouling, they have not fully prevented it. It is also a characteristic of the prior art paints, nearly all of which contain cuprous oxide, that they have a dark color, which prevents their being manufactured in aesthetically pleasing lighter hues. Furthermore, these paints (i.e. those which are copper- or cuprous oxide-based) aggravate the corrosion of steel hulls and the corrosion products counteract their antifouling activity.

It is an object of the present invention to provide marine antifouling compositions which, in addition to preventing the fouling of submerged structures for extended periods of time, may be prepared in the lighter colors and do not aggravate the corrosion of steel hulls. It is another object of the present invention to provide a novel class of compounds which are highly effective as toxicants in marine antifouling paints. It is still another object of the invention to provide a method for the prevention of fouling of marine structures. Other objects will become evident hereinafter.

In accordance with these and other objects of the invention, it has been found that when not less than about 10% by weight of a bis(tributyltin)ester of an aliphatic dicarboxylic acid, said acid containing a total of not more than about 20 carbon atoms, is dispersed in a substantially water-insoluble film-forming vehicle (such, for example, as spar varnish, vinyl acetate-vinyl chloride copolymer base paints, and the like), marine anti-fouling paint compositions are formed which are capable of providing essentially complete protection to submerged structures from marine fouling for extended periods of time. The term "a bis (tributyltin) ester of an aliphatic decarboxylic acid" when used herein includes carbonic acid and oxalic acid esters and esters of aliphatic dicarboxylic acids containing divalent branched and unsaturated aliphatic hydrocarbon groups as well as saturated straight chain aliphatic hydrocarbon groups between the carboxyls. Preferably the antifouling paints according to the invention contain from approximately 25 to 75 percent by weight based on the dry paint film (i.e. about 10 to 50 percent by weight based on the liquid paint composition) of the bis ester. Antifouling paints containing amounts of the bis ester below this range are relatively ineffectual in inhibiting the growth of marine anti-fouling organisms while those containing amounts in excess thereof are unsatisfactory with regard to their film-forming properties (e.g., such films often lack the requisite cohesive and adhesive properties for antifouling paints).

Among the bis(tributyltin)esters which are useful as toxicants in the antifouling paints of the present invention are the esters of carbonic acid, oxalic acid, malonic acid, succinic acid, glutaric acid, adipic acid, pimelic acid, suberic acid, azelic acid, sebacic acid, n-octenyl succinic acid, n-octyl succinic acid, octenyl(branched) succinic acid, octyl (branched) succinic acid, nonenyl succinic acid, nonyl succinic acid, dodecenyl succinic acid, dodecyl succinic acid, 2-ethylsuberic acid, 2,4-diethyl adipic acid, azelaic acid, dodecanoyldicarboxylic acid, hexadecanoyldicarboxylic acid, octadecanoyldicarboxylic acid, etc.

It has been found that panels coated with the compositions of this invention and exposed to severe fouling conditions in the ocean near Miami, Florida for periods of several months remain free of fouling. Under comparable conditions, untreated control panels become heavily encrusted with barnacles. It is noted that the action of the bis esters in the antifouling paints of the invention may be either as repellants, as toxicants or both and the occasional use herein of the term "toxicant" with respect thereto is for purposes of convenience rather than limitation in this regard.

The bis esters are prepared by condensing the appropriate dibasic acid or the anhydride thereof with bis tributyltin oxide and removing the water formed in the reaction, when an acid is used.

The bis (tributyltin) esters of the unbranched, saturated lower aliphatic dicarboxylic acids which acids contain not more than ten carbon atoms, e.g., carbonic acid, oxalic acid, malonic acid, succinic acid, glutaric acid, adipic acid, pimelic acid, suberic acid and sebacic acid are novel and useful compositions of matter and form an important aspect of the present invention. A particularly preferred group within this class consists of bis(tributyltin)oxalate, bis(tributyltin)malonate and bis(tributyltin)adipate. These three esters are consistently superior toxicants in all of the antifouling paint vehicles tested and, in addition, are prepared from relatively easily and economically available precursors.

The bis ester toxicants may be utilized in various antifouling paint vehicles including exfoliating or submerged "chalking" types, in which the surface is deliberately loaded with inert fillers to control the water permeability of the film and promote chalking (e.g., see Young, G. H., Schneider, W. K. and Scagren, G. W., Industrial and Engineering Chemistry, 36, 1130–1132, 1944); "cannon ball" or particle contact types in which a high concentration of toxicant is used in a relatively water impermeable and insoluble matrix and the toxicant is made available largely by slow dissolution out of the matrix structure (e.g., see Ferry, J. D. and Ketchum, B. H., Industrial and Engineering Chemistry, 38, 806–810, August 1946); and soluble matrix types in which the matrix slowly dissolves thus releasing the toxicant (e.g., see Ketchum, B. H., Ferry, J. D. and Burns, A. E., Industrial and Engineering Chemistry, 38, 931–936, September 1946); and modifications of each of these. The vehicles of all marine antifouling paints may be considered to be "permeable" since a degree of permeability is necessary to make the active ingredients initially available at the surface of the paint film. In the particle contact type of paint, however, vehicles which are relatively insoluble in sea water may be used since the major mechanism for making the active ingredients available is through the exposing of new particles of active ingredients by the dissolution of other particles thereof with which they are in contact.

Conventional additives for antifouling paint compositions such as fillers, driers, thickeners, pigments, dyes and the like can, if desired, be added to the antifouling paint compositions of the invention, so long as the concentration of the bis ester being used is above the minimum effective concentration and the permeability of the particular paint is not adversely affected. Similarly, agents which tend to increase the water permeability of antifouling paint films, e.g., rosin, may be added. The addition of such agents and the consequent increase of the permeability of the antifouling paint film will, other things being equal, result in a relatively more rapid release of toxicant and consequently a shorter period of protection from fouling.

The paint-like compositions of the invention are applied by brushing, spraying, rolling or by other convenient methods to form the final coating for surfaces exposed to fouling. They can be applied over other paint if desired. Thus, application of one or more priming and corrosion-resisting coatings may be followed by one or more coatings of the compositions of the invention. In making the application, the normal procedures of cleaning and priming the surfaces are carried out and the antifouling coating is applied last. Two or more coatings may be applied if desired but this is generally not necessary if thorough coverage of the surface is effected with one coat.

The following examples will illustrate the best mode contemplated for practicing the invention without being limiting thereto, since it is within the skill of the art to prepare further formulations consisting of paint vehicles incorporating the bis esters, following the disclosure herein made. All parts are by weight unless otherwise specified.

*Example 1.—Preparation of bis (tributyltin)oxalate*

About 155 grams of bis tributyltin oxide, 23 grams of oxalic acid and 30 ml. of benzene are charged at room temperature to a 250 ml. flask. The mixture is heated to approximately 100° C. at atmospheric pressure and maintained under those conditions for 10 minutes. The reaction flask is then connected to a vacuum system through a Dry Ice-acetone-cooled trap and evacuated to a pressure of about 15 mm. of mercury. The contents of the flask are held at about 100° C. and 15 mm. of mercury pressure for ½ hour during which time the volatiles are removed. The resulting white crystalline product is relatively pure bis(tributyltin)oxalate. Although this material is relatively insoluble in common solvents, a small sample is recrystallized from dioxane. The melting point of this sample is 147° C. and it has a refractive index $n_D^{28°\,C.}$ of 1.5050, the $n_D^{28°\,C.}$ being obtained before recrystallization.

*Example 2.—Preparation of bis(tributyltin)malonate*

About 153 grams of bis tributyltin oxide, 26 grams of malonic acid and 100 ml. of toluene are charged at room temperature to a 500 ml. flask and the mixture is heated to approximately 130° C. at atmospheric pressure and maintained under those conditions for 10 minutes. The reaction flask is then connected to a vacuum system through a Dry Ice-acetone-cooled trap and evacuated to a pressure of about 15 mm. of mercury. The contents of the flask are held at that pressure and about 130° C. for ½ hour during which time the volatiles are removed. The mushy white residue is identified as crude bis(tributyltin)malonate. It is sublimed under reduced pressure to form a white crystalline product melting at 79–80° C. and containing 34.6% tin, 8.5% hydrogen and 47.7% carbon compared to calculated values of 34.8%, 8.2% and 47.5% respectively.

*Example 3.—Preparation of bis(tributyltin)adipate*

About 600 grams of bis tributyltin oxide and 146 grams of adipic acid are charged at room temperature to a 1 liter flask which is connected to a vacuum system (about 15 mm. of mercury) through a Dry Ice-acetone-cooled trap. The mixture is heated at 150° C. for approximately 10 minutes, during which time the volatiles are continually distilled out of the reaction mixture and condensed in the trap. The resulting product, crude bis(tributyltin)adipate, is then poured, while still hot, into a Pyrex dish where it solidifies upon cooling. The crude material is purified by recrystallization from heptane to form a white crystalline product melting at 101–102° C. and containing 33.0% tin, 8.5% hydrogen and 49.5% carbon compared to calculated values of 32.8%, 8.5% and 49.7% respectively.

| Dicarboxylic Acid Moiety | M.P.,° C. | Percent Tin | | Percent Hydrogen | | Percent Carbon | | $n_D$ | Solvent of Recrystallization |
|---|---|---|---|---|---|---|---|---|---|
| | | Calc. | Found | Calc. | Found | Calc. | Found | | |
| Carbonic [1] | | 37.1 | 37.8 | 8.5 | 8.5 | 46.9 | 47.0 | 1.4960 (28° C.) | |
| Oxalic [2] | 147 | | | | | | | 1.5050 (28° C.) [6] | Dioxane. |
| Malonic [3] | 79–80 | 34.8 | 34.6 | 8.2 | 8.5 | 47.5 | 47.7 | | Sublimed. |
| Succinic [4] | 98–99 | | | 8.3 | 8.4 | 48.3 | 48.3 | | Dioxane. |
| Glutaric [4] | 87–88 | | | | | | | | Heptane. |
| Adipic [4] | 101–102 | 32.8 | 33.0 | 8.5 | 8.5 | 49.7 | 49.5 | | Do. |
| Pimelic [4] | 101–102 | | | | | | | | Do. |
| Suberic [4] | 120–121 | | | | | | | | Do. |
| Azelic [4] | 97–98 | 31.0 | 31.1 | 8.9 | 8.8 | 51.7 | 51.5 | | Do. |
| Sebacic [4] | 96–97 | 30.4 | 30.6 | 9.0 | 8.7 | 42.3 | 52.4 | | Do. |
| n-Octenyl succinic [5] | 51–52 | | | | | | | | Do. |
| n-Octyl succinic [5] | 62–63 | | | | | | | | Do. |
| Octenyl (branched) succinic [5] | | | | | | | | 1.4913 (40° C.) | |
| Octyl (branched) succinic [5] | | | | | | | | 1.4834 (40° C.) | |
| Nonenyl succinic [5] | | | | | | | | 1.4917 (40° C.) | |
| Nonyl succinic [5] | | | | | | | | 1.4820 (40.° C) | |
| Dodecenyl succinic [5] | | | | | | | | 1.4980 (28° C.) | |
| Dodecyl succinic [5] | | | | | | | | 1.4882 (28° C.) | |

[1] Very viscous liquid.
[2] Crystallizes only after vacuum stripping of impurities. Quite insoluble in all solvents.
[3] Fairly soluble in heptane, dioxane methanol.
[4] Prepared from acid and bis(tributyltin) oxide removing water as azeotrope of benzene or toluene.
[5] Prepared from the respective anhydride and bis(tributyltin) oxide.
[6] Refractive index obtained from sample before recrystallization.

Example 4

The preparations of a number of bis esters suitable for use in the antifouling paint compositions of the invention (including those of the oxalate, malonate and adipate which are given in detail in Examples 1-3) are summarized in the table above.

Example 5

A series of paint compositions according to the present invention is prepared by mixing finely divided bis(tributyltin)oxalate, bis(tributyltin)malonate and bis(tributyltin)adipate into a marine spar varnish having the following approximate composition:

| | |
|---|---|
| Refined linseed varnish oil | 100 |
| Modified oil-soluble phenolic resin | 125 |
| Gum rosin | 25 |
| Chinawood oil | 390 |
| Pentaerythritol ester gum | 100 |
| Mineral spirits | 425 |
| Terpenoid and aromatic thinner | 265 |
| 6% cobalt drier | 5 |
| 24% lead naphthenate drier | 5 |

For purposes of comparison, similar mixtures are also prepared utilizing bis tributyltin oxide and cuprous oxide (a commercially available antifouling agent) as toxicants.

Panels of exterior type plywood are coated with each of the paint mixtures and a control panel is coated with the same paint base to which no toxicant has been added. The panels are exposed to fouling conditions by submerging them in the sea at Miami, Florida and are examined monthly to determine the ability of each to retain at least 85 percent antifouling activity. The 85 percent antifouling activity is determined as follows: The number of barnacles, hydroids, bryozoa, oysters, tubeworms, and other macroscopic fouling organisms which adhere to each test panel is counted once each month, and compared with the number of the same types of organisms on a non-toxic plate glass panel of the same area immersed for the same period. The percent antifouling activity is then calculated utilizing the following equation:

$$\text{Per cent antifouling activity} = 100 - \frac{100x}{y}$$

where $x$ is the number of fouling organisms on the test panel and $y$ is the number of fouling organisms on the non-toxic control panel. The results are set out in the following table, in which the concentrations of the respective toxicants are given both as percentages of the total paint compositions applied to the panels and as percentages of the resulting dry paint films.

| Toxicant | Percent Concentration of Toxicant | | Months [1] |
|---|---|---|---|
| | Wet Basis | Dry Basis | |
| Bis(tributyltin)oxalate | 50 | 66 | 10 |
| | 33 | 49 | 4 |
| Bis(tributyltin)malonate | 50 | 66 | 9 |
| | 33 | 49 | 4 |
| Bis(tributyltin)adipate | 33 | 49 | >18 |
| Bis tributyltin oxide | 33 | 49 | 1 |
| Cuprous oxide | 55 | 69 | <1 |
| None (control) | 0 | 0 | <1 |

[1] Number of months that at least 85% antifouling activity is retained.

Example 6

Modified soluble matrix type paints are prepared by mixing bis(tributyltin)oxalate, bis(tributyltin)malonate and bis(tributyltin)adipate into the following vinyl-base coating (which meets U.S. Navy specifications for U.S. Navy antifouling paint formula No. 121):

| | Parts by weight |
|---|---|
| Vinyl chloride-vinyl acetate copolymer [1] | 80 |
| Gum rosin | 80 |
| Tricresyl phosphate | 30 |
| Methyl isobutyl ketone | 275 |
| Xylene | 185 |

[1] A copolymer of 87 mole percent vinyl chloride and 13 mole percent vinyl acetate available as a white powder under the trade designation "VYHH" from the Bakelite Division of the Union Carbide and Carbon Corporation of New York, New York.

This formulation, which is white in color, may be pigmented to provide a standard grey color. A series of antifouling paints according to the invention is prepared by adding varying amounts of bis(tributyltin)oxalate, bis(tributyltin) malonate and bis(tributyltin)adipate to the formulation. In addition, two other lots of antifouling paint based on the same formulation are prepared for comparison utilizing bis tributyltin oxide and cuprous oxide as toxicants. Test panels of exterior type plywood are then coated with each of these paints and are tested for resistance to fouling according to the procedure of the previous example. The results are given in the following table:

| Toxicant | Percent Concentration of Toxicant | | Months |
|---|---|---|---|
| | Wet Basis | Dry Basis | |
| Bis(tributyltin)oxalate | 50 | 78 | 15 |
| | 33 | 63 | >18 |
| | 20 | 46 | 11 |
| Bis(tributyltin)malonate | 50 | 78 | >18 |
| | 33 | 63 | 16 |
| | 20 | 46 | 16 |
| Bis(tributyltin)adipate | 37.5 | 63 | 29 |
| Bis tributyltin oxide | 37.5 | 63 | 3 |
| Cuprous oxide | 55 | 81 | 3 |

The following series of similar antifouling paints is also prepared utilizing bis(tributyltin)adipate as the toxicant, all constituents being given in parts by weight:

| Lot | Bis tributyltin Adipate | Gum Rosin | "VYHH" Resin | Tricresyl Phosphate | Solvent [1] |
|---|---|---|---|---|---|
| A | 4.65 | 0 | 8 | 0.8 | 23 |
| B | 4.65 | 4 | 4 | 1.6 | 23 |
| C | 10.8 | 2.67 | 5.33 | 0.8 | 23 |
| D | 10.8 | 4 | 4 | 1.6 | 23 |
| E | 19.5 | 2.67 | 5.33 | 0.8 | 23 |
| F | 19.5 | 0 | 8 | 1.6 | 23 |
| G | 32.5 | 0 | 8 | 0.8 | 23 |
| H | 32.5 | 2.67 | 5.33 | 1.6 | 23 |
| I | 32.5 | 0 | 8 | 1.6 | 23 |

[1] 13.7 parts of methyl isobutyl ketone and 9.3 parts of xylene.

8 by 10 inch test panels of exterior type plywood are coated with from approximately 11 to 17 grams (dry weight) of each of these paints and are then also tested for resistance to fouling according to the test procedure of Example 2. The results are as follows:

| Lot | Percent Concentration of Toxicant (Wet Basis) | Months |
|---|---|---|
| A | 12.5 | 9 |
| B | 12.5 | 7 |
| C | 25 | 17 |
| D | 25 | 16 |
| E | 37.5 | 27+ |
| F | 37.5 | 27+ |
| G | 50 | 27+ |
| H | 50 | 27+ |
| I | 50 | 27+ |

Example 7

Toxicants of the invention are also evaluated in antifouling paints using as a vehicle a 13 percent solution of "VYHH" vinyl chloride-vinyl acetate copolymer in a solvent consisting of 60 parts by weight of methylisobutylketone and 40 parts of xylene. The results of antifouling tests run in the manner previously described in the sea of Miami, Florida on panels coated with several of these paints and with a control panel (coated with test vehicle containing no toxicant) are given in the following table, the number of months which the panels retain at least 85 percent antifouling activity being reported.

| Toxicant | Percent Concentration of Toxicant | | Months |
|---|---|---|---|
| | Wet Basis | Dry Basis | |
| Bis(tributyltin)oxalate | 44 | 86 | 11 |
| Bis(tributyltin)malonate | 44 | 86 | >18 |
| | 29 | 76 | >18 |
| | 17 | 61 | 13 |
| Bis(tributyltin)adipate | 17 | 61 | >18 |
| Control (vehicle with no toxicant) | 0 | 0 | <1 |

*Example 8*

The following table sets out the results of a number of tests of antifouling paints prepared according to the invention and formulated and tested as indicated. The test data of Examples 5-7 on bis(tributyltin)oxalate, bis(tributyltin)malonate and bis(tributyltin)adipate are included for the sake of comparison.

manner previously described are given in the following table. The number of months which the panels retain at least 85% anti-fouling activity are reported.

Percent bis tributyltin adipate
(dry weight basis): Months
57 ............................................. >18
43 ............................................. 8

*Example 10*

Two antifouling bottom paints are prepared utilizing the same formulation except that different pigments are used for color. The formulation for these two lots is as follows:

| | Weight percent |
|---|---|
| Bis(tributyltin)adipate | 14.04 |
| Vinyl chloride vinyl acetate copolymer [1] | 12.20 |
| Gum rosin | 6.10 |
| Titanium dioxide | .73 |
| Colored pigment | 2.93 |
| Diisobutyl ketone | 38.40 |
| Xylol | 25.60 |

[1] "VYHH"; 87 mole percent vinyl chloride and 13 mole percent vinyl acetate.

The colored pigment in the first lot is red iron oxide while that in the second lot is phthalocyanine blue pigment. Panels of exterior type plywood are coated with each of these paint formulations and the panels are exposed to fouling conditions by submerging in the sea at Miami,

| Toxicant | Copolymer Vehicle [1] | | Navy Vinyl Vehicle [2] | | Spar Varnish Vehicle [3] | |
|---|---|---|---|---|---|---|
| | Toxicant Concn.[4] | Months Protec.[5] | Toxicant Concn.[4] | Months Protec.[5] | Toxicant Concn.[4] | Months Protec.[5] |
| Bis(tributyltin)carbonate | | | 50 | 5 | 50 | 2 |
| Bis(tributyltin)oxalate | 44 | 11 | 50 | 15 | 50 | 10 |
| Do | 29 | 4 | 33 | >18 | 33 | 4 |
| Do | 17 | 3 | 20 | 11 | | |
| Bis(tributyltin)malonate | 44 | >18 | 50 | >18 | 50 | 9 |
| Do | 29 | >18 | 33 | 16 | 33 | 4 |
| Do | 17 | 13 | 20 | 16 | | |
| Bis(tributyltin)glutarate | | | 50 | 4 | 50 | 2 |
| Bis(tributyltin)adipate | 44 | 9 | 50 | 16 | 50 | >18 |
| | | | 37.5 | 29 | | |
| Do | 29 | 15 | 33 | >18 | 33 | >18 |
| Do | 17 | >18 | 20 | 6 | 20 | 4 |
| Bis(tributyltin)pimelate | | | 33 | 2 | 33 | 3 |
| Bis(tributyltin)suberate | | | 33 | 4 | 33 | 10 |
| Bis(tributyltin)octyl succinate | 29 | 4 | 33 | 2 | 20 | 1 |
| Do | 17 | 4 | 20 | 2 | | |
| Bis(tributyltin)octenyl succinate | 29 | 15 | 20 | 4 | 50 | 9 |
| Do | 17 | 3 | | | | |
| Bis(tributyltin)dodecenyl succinate | 29 | 3 | 20 | 3 | 50 | 3 |
| Do | 17 | 15 | | | 33 | 2 |
| Do | | | | | 20 | 2 |

[1] Paints prepared and tested according to the formulations and procedures of Example 7 with the toxicants varied as indicated.
[2] Paints prepared and tested according to the formulations and procedures of Example 6 with the toxicants varied as indicated.
[3] Paints prepared and tested according to the formulations and procedures of Example 5 with the toxicants varied as indicated.
[4] Wet basis.
[5] Number of months during which the test panels retain at least 85 percent antifouling activity.

*Example 9*

Two red antifouling bottom paints with anticorrosion properties useful for steel ships are prepared by dispersing varying percentages of bis(tributyltin)adipate into the following compositions:

| | Parts by weight |
|---|---|
| Dry red lead pigment | 359 |
| Vinyl chloride-vinyl acetate-polyvinyl alcohol copolymer [1] | 240.8 |
| Phthalate plasticizer | 24 |
| Methyl isobutyl ketone | 776.2 |
| Toluol | 388 |

[1] A copolymer of 91% vinyl chloride, 3% vinyl acetate and 6% polyvinyl alcohol having a specific viscosity at 20° C. (utilizing 1 gram of resin per 100 grams of methyl isobutyl ketone) of approximately 0.565-0.635 and available under the trade designation "VAGH" from the Bakelite Division of the Union Carbide and Carbon Corporation of New York, New York.

The results of anti-fouling tests in the sea at Miami, Florida on panels coated with these formulations in the Florida and are examined at monthly intervals to determine to what extent fouling has occurred. The panel coated with the red antifouling paint retains 85% antifouling activity for nine months while the panel coated with the blue antifouling paint retains 85% antifouling activity for ten months.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. Bis(tributyltin)adipate.

2. A marine antifouling composition comprising in admixture a permeable marine paint and, as an active ingredient, an effective amount not less than about 10 percent by weight of bis(tributyltin)adipate.

3. A method of inhibiting the growth of marine organisms on a surface to be submerged in the sea comprising coating said surface with a marine antifouling composition comprising in admixture a permeable marine paint and, as an active ingredient, an effective amount not less than about 10 percent by weight of bis(tributyltin)adipate.

References Cited by the Examiner

UNITED STATES PATENTS

| | | | |
|---|---|---|---|
| 2,560,034 | 7/1951 | Eberly | 260—429.7 |
| 2,727,917 | 12/1955 | Mack et al. | 260—429.7 |
| 2,809,897 | 10/1957 | Christensen et al. | 106—15 |
| 2,904,569 | 9/1959 | Ramsden | 260—429.7 |
| 2,910,452 | 10/1959 | Crauland | 260—45.75 |
| 2,977,379 | 3/1961 | Dorfelt et al. | 260—429.7 |
| 3,037,040 | 5/1962 | Anderson et al. | 260—429.7 |
| 3,095,427 | 6/1963 | Kelso | 260—429.7 |

FOREIGN PATENTS 578,312    6/1946    Great Britain.

TOBIAS E. LEVOW, *Primary Examiner.*

ABRAHAM H. WINKELSTEIN, *Examiner.*